United States Patent
Tan et al.

(10) Patent No.: US 7,334,336 B2
(45) Date of Patent: Feb. 26, 2008

(54) METHOD FOR PRODUCING A SLEEVED POLYMER MEMBER, AN IMAGE CYLINDER OR A BLANKET CYLINDER

(75) Inventors: Biao Tan, Penfield, NY (US); Craig M. Cody, Scottsville, NY (US); Po-Jen Shih, Webster, NY (US); Joseph A. Pavlisko, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 252 days.

(21) Appl. No.: 11/017,397

(22) Filed: Dec. 20, 2004

(65) Prior Publication Data

US 2005/0138809 A1 Jun. 30, 2005

Related U.S. Application Data

(60) Provisional application No. 60/531,921, filed on Dec. 23, 2003.

(51) Int. Cl.
*B21D 53/00* (2006.01)
*B21K 1/02* (2006.01)

(52) U.S. Cl. ............................ 29/895.3; 101/375
(58) Field of Classification Search .............. 29/895.3; 101/375

See application file for complete search history.

(56) References Cited

U.S. PATENT DOCUMENTS

| 6,393,226 | B1 * | 5/2002 | Charlebois et al. ........... 399/12 |
| 6,605,399 | B2 * | 8/2003 | Chowdry et al. ............. 430/62 |
| 6,923,540 | B2 * | 8/2005 | Ye et al. ...................... 351/161 |
| 2006/0137183 | A1 * | 6/2006 | Simonsohn ............. 29/894.354 |

FOREIGN PATENT DOCUMENTS

JP 09123194 * 5/1997

* cited by examiner

*Primary Examiner*—Daniel J. Colilla
*Assistant Examiner*—Marissa Ferguson-Samreth
(74) *Attorney, Agent, or Firm*—Carl F. Ruoff

(57) ABSTRACT

This invention relates to a method for producing a polymer sleeve including a polymer sleeve for use with an image cylinder or a blanket cylinder in an electrophotographic process so that the sleeve has a stretched length as mounted on the mandrel equal to a length of the mandrel.

6 Claims, 4 Drawing Sheets

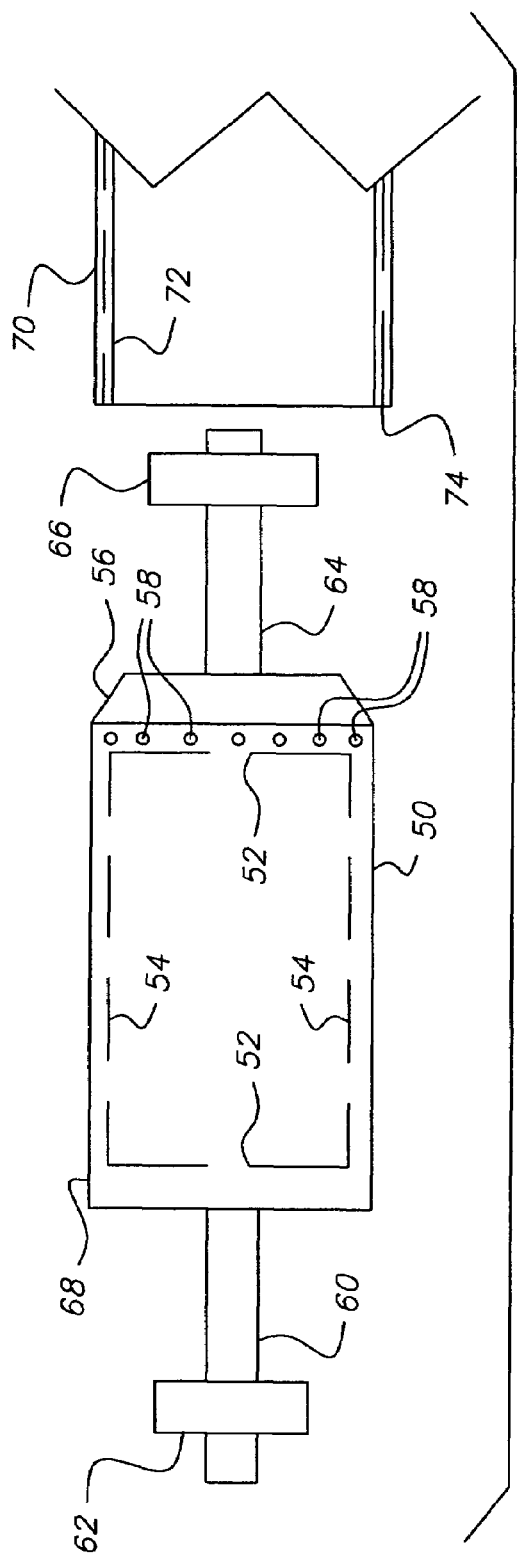
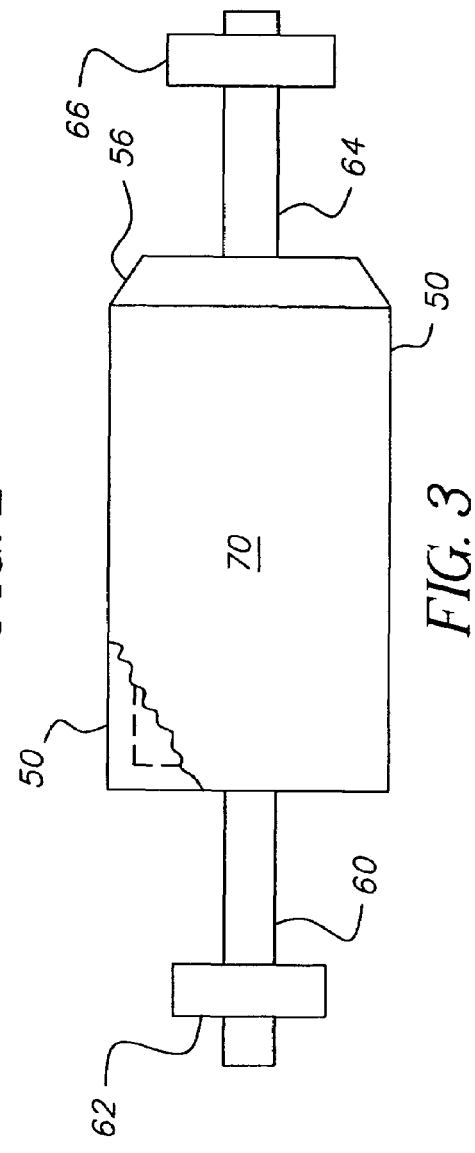
FIG. 2
FIG. 3

METHOD FOR PRODUCING A SLEEVED POLYMER MEMBER, AN IMAGE CYLINDER OR A BLANKET CYLINDER

RELATED APPLICATIONS

This application is a provisional of application Ser. No. 60/531,921, filed on Dec. 23, 2003.

FIELD OF THE INVENTION

This invention relates to a method for producing a polymer sleeve for an image cylinder or a blanket cylinder having a length equal to the cylinder mandrel for use in an electrophotographic process wherein the polymer sleeve requires no metal core and has a desired expanded length.

BACKGROUND OF THE INVENTION

In electrophotographic processes requiring an image cylinder and a blanket cylinder to produce electrophotographic copies, the image cylinder typically receives a charge, an image and a toner coating on the image area and then transfers the toner image to a blanket cylinder. The blanket cylinder transfers the toner image to a substrate, such as paper or the like, which passes via a web between the blanket cylinder and a back pressure roller to transfer the toner image to the substrate with the substrate thereafter being fused, as well known to the art.

In such processes, the image cylinder is a cylinder that typically includes a mandrel, which may be of aluminum, steel or any other suitably durable metal or conductive polymer of a suitable thickness to produce a noncompliant member that may be about 10 millimeters (mm) in thickness. The mandrel may include reinforcing structure internally and includes a very smooth, low out-of-round tolerance exterior. The image cylinder includes a mandrel and a sleeve positioned over the outside of the mandrel and is used for production and transfer of the images to the blanket cylinder. The image cylinder has a photosensitive layer on the exterior of the sleeve. The mandrel also includes bearings connected to each of its ends for positioning it in an electrophotographic copying machine and has an air inlet into an interior of the mandrel for an air discharge through a plurality of holes placed around one end of the mandrel near a tapered end of the mandrel.

In such processes, the blanket cylinder is a cylinder that typically includes a mandrel, which may be of aluminum, steel or any other suitably durable metal or conductive polymer of a suitable thickness to produce a noncompliant member that may be about 10 millimeters (mm) in thickness. The mandrel may include reinforcing structure internally and includes a very smooth, low out-of-round tolerance exterior. The blanket cylinder includes a mandrel and a sleeve positioned over the outside of the mandrel and is used for transfer of the images from the blanket cylinder to a substrate. The mandrel also includes fittings connected to each of its ends for positioning it in an electrophotographic copying machine and has an air inlet into an interior of the mandrel for an air discharge through a plurality of holes placed around one end of the mandrel near a tapered end of the mandrel.

The sleeves have been produced by use of a metal core, which is typically a noncompliant metal member, such as nickel or the like, which is produced by plating. The core must be seamless and must provide a very low variation surface outer diameter. The polymer layer has been positioned around the outside of the metal core, the metal core is mounted on a mandrel or the like, and the polymer layer is machined to a desired thickness. Additional exterior coatings have been applied by techniques such as ring coating and the like. The completed sleeve will have an internal diameter slightly less (typically about 100 microns) than the outer diameter of the mandrel upon which it is to be placed. This interference fit allows the sleeve to be firmly positioned on the outside of the mandrel after it is installed. The sleeve must have a smooth exterior and a closely controlled wall thickness.

The sleeve is typically installed by urging it toward and onto the tapered end section of the mandrel while air is ejected through the holes at the end of the mandrel near the tapered section. The air injection permits the positioning of the sleeve on the mandrel by an air bearing technique as known to those skilled in the art. The interference fit between the sleeve and the mandrel is accomplished and the sleeve is retained snugly and firmly in position on the outside of the mandrel. The outside of the mandrel, including the sleeve, must have an outside diameter variation within a range of about +/−12.5 microns. This close tolerance is necessary to ensure accurate receipt of images from the image cylinder and accurate transmission of the images to the substrate by the blanket cylinder.

There are various other specific requirements for the blanket cylinder and it has been previously considered necessary to meet these other requirements as well as those discussed above by the use of a metal core in the sleeve. This is a relatively expensive, time-consuming step and the cores are relatively expensive. As a result, a continued effort has been directed to the development of methods for producing sleeves more economically that will meet the demanding requirements for the blanket cylinder sleeves.

SUMMARY OF THE INVENTION

According to the present invention, a method for producing a polymer sleeve for mounting on a mandrel to form an image cylinder or a blanket cylinder for use in an electrophotographic process is provided. The method provides for producing a sleeve having a sidewall of a polymer selected from the group consisting of thermoplastic, thermoset and elastomeric polymers and blends thereof and rigid polyurethanes, the sleeve having an inner diameter from about 1 to about 20 percent less than the outer diameter of the mandrel.

The invention further provides a method for producing a polymer sleeve for mounting on a mandrel having an outer diameter and a length to form an image cylinder or a blanket cylinder for use in an electrophotographic process, the method providing a production mandrel having an outer diameter from about 1 to about 20 percent smaller than the outer diameter of the mandrel; positioning a polymeric material comprising at least one of a thermoplastic polymer, a thermoset polymer, an elastomeric polymer, a polyurethane polymer and blends thereof, optionally containing at least one of additives and fillers around the outside of the production mandrel to form a layer of the polymeric material on the production mandrel; machining the polymeric material on the production mandrel to produce the polymer sleeve having a desired outer sleeve diameter; adjusting a length of the polymer sleeve to a length which after positioning on the mandrel is equal to the length of the mandrel; and removing the polymer sleeve having the desired outer sleeve diameter, an inner diameter equal to the outer diameter of the production mandrel and an adjusted length from the production mandrel.

The invention further provides a method for producing a polymer sleeve for mounting on a mandrel having an outer diameter and a length to produce a blanket cylinder or an image cylinder for use in an electrophotographic process, the method providing a rotatable mold having an inside diameter and a length, the inside diameter of the mold being equal to a desired outer diameter of the polymer sleeve; injecting at least one of a thermoplastic, thermoset, an elastomeric and a polyurethane polymer and blends thereof into the rotatable mold in a quantity to produce the polymer sleeve having an inside and a desired sidewall thickness upon heating and rotating the rotatable mold; and, adjusting the length of the rotatable mold to produce the polymer sleeve of a length, which upon positioning on the mandrel is equal to the length of the mandrel, the inside of the sleeve having a diameter from about 1 to about 20 percent smaller than the outer diameter of the mandrel.

BRIEF DESCRIPTION OF THE DRAWINGS

FIG. 2 is a schematic diagram of a mandrel and a sleeve, with the sleeve being positioned for installation on the mandrel;

FIG. 3 is a schematic diagram of a sleeve positioned on the mandrel;

DESCRIPTION OF PREFERRED EMBODIMENTS

In the description of the figures, the same numbers will be used to refer to the same or similar components throughout in the discussion of the figures.

Figure 1:
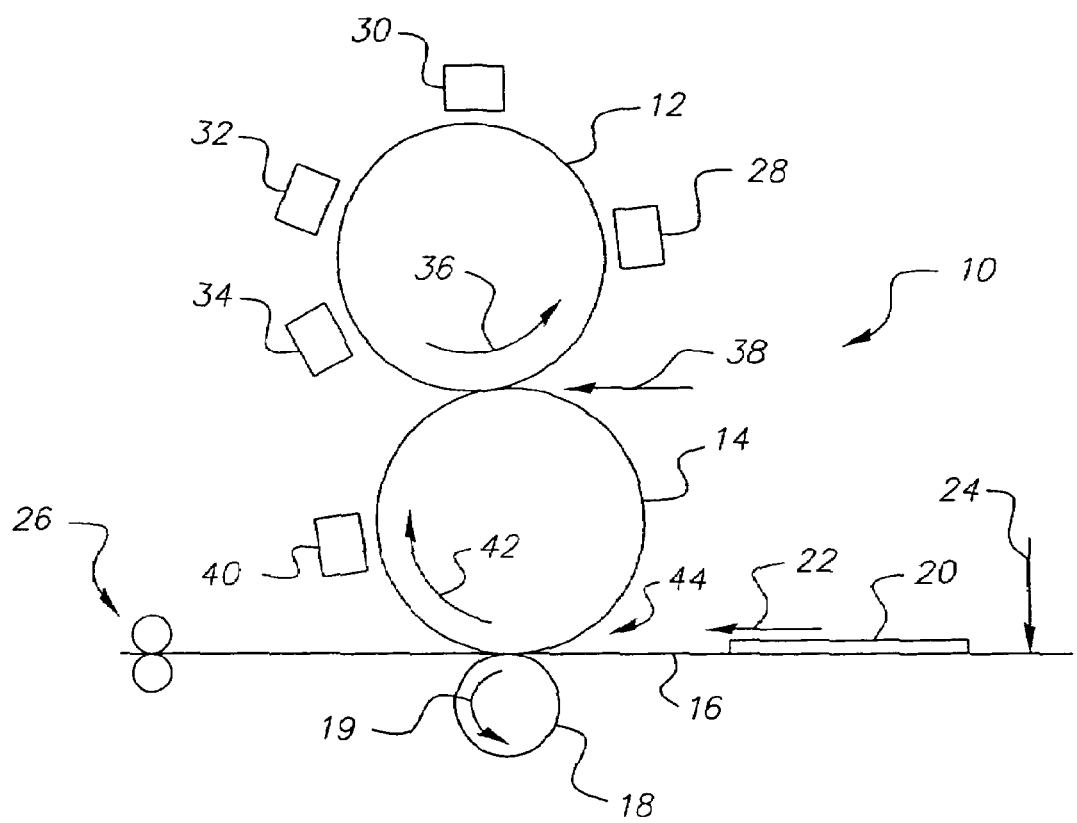
FIG. 1 shows an embodiment of a process and system wherein a blanket cylinder and/or imaging cylinder according to present invention is used.

In FIG. 1, an electrophotographic process and system 10 are shown. The process includes an image cylinder 12 positioned in engagement with a blanket cylinder 14, which is positioned in engagement with a web 16 and a back pressure roller 18. A substrate 20, which may be paper or the like, is passed along a web 16 between blanket cylinder 14 and back pressure roller 18. The substrate, now bearing an image, is passed along web 16 to a fuser section 26 where it is fused as known to those skilled in the art. The direction of travel of the substrate is shown by arrow 22. A sensor 24 is positioned to ensure that substrate 20 passes in contact with blanket cylinder 14 at a proper time so that the image is properly positioned on substrate 20.

In the operation of the process, image cylinder 12 rotates in a direction shown by arrow 36 and blanket cylinder 14 rotates in a direction shown by arrow 42. Back pressure roller 18 turns in a direction as shown by arrow 19. A nip 38 is formed between image cylinder 12 and blanket cylinder 14. The nip is typically about 4.5+/−1 mm in width. Similarly, a nip 44 is formed Between blanket cylinder 14 and back pressure roller 18. This nip is about 4 to about 10 mm in width. A cleaning station 28 is positioned to contact the surface of image cylinder 12 after it passes nip 38. The clean image cylinder surface then passes a charger station 30, a writer station 32 where an electrostatic image is placed on the surface of cylinder 12 and a toner station 34 that applies toner to the electrostatic image, which is then transferred at nip 38 to blanket cylinder 14. Blanket cylinder 14 transfers the image to substrate 20 and is thereafter cleaned by a cleaner 40 to ensure that a clean surface is provided on blanket cylinder 14 for transfer of an additional image from image cylinder 12.

The image cylinder and blanket cylinder are of similar construction, although their outer coatings are different.

As shown in FIG. 2, blanket cylinder 12 includes a mandrel 50 that has side walls 54 and ends 52 and includes a tube 60 which supports a bearing 62 in operative engagement with one end of mandrel 50 and a shaft 64 which supports a second bearing 66 in operative engagement with the other end of mandrel 50.

Tube 60 is adapted for the injection of air into mandrel 50, which includes near one of its ends, a taper 56, and a plurality of air holes 58. These air holes are used for the ejection of air during the installation of a sleeve over mandrel 50. Mandrel 50 has an outside diameter 68, which is somewhat larger than the inner diameter 72 of a sleeve 70. Sleeve 70 as shown, is a polymer sleeve according to the present invention. Its end 74 is urged into engagement with tapered section 56 of mandrel 50 and the sleeve is placed over an outside diameter 68 of mandrel 50 by an air step process using the ejection of air through holes 58.

In FIG. 3, an installed sleeve, according to the present invention, is shown on mandrel 50. The mandrel and sleeve that comprise blanket cylinder 14 are now assembled.

The blanket cylinder may have an outer diameter from about 40 mm to about 600 mm. While the diameter may vary widely, the variations in diameter or the out of round run out must be limited to +/−12.5 microns. This is necessary to ensure that the proper nip is achieved between the blanket cylinder and the pressure roller and that good image transfer from the image cylinder to the blanket cylinder and from the blanket cylinder to the substrate is accomplished.

The image cylinder may have a diameter from about 40 mm to about 600 mm. While the diameter may vary widely, the variations in diameter or the out of round run out must be limited to +/−12.5 microns. This is necessary to ensure that the proper nip is achieved with the blanket cylinder and that good image transfer is accomplished.

Desirably the outside of the image cylinder sleeve 70 has a Shore A hardness of about 90+/−10. The hardness is readily varied by changing the formulation of the polymer, as well known to those skilled in the art. The thickness of the sleeve wall may be from about 125 to about 1000 mm. The sleeve wall is polymer and is rigid enough to handle. Further the polymer desirably has a conductivity of at least $10^{10}$ ohms·cm. As known to those skilled in the art, the polymer can be somewhat more conductive if desired. To produce an acceptable exterior surface on image cylinder 12, it is necessary that the wall thickness of the sleeve be held to a thickness variation of +/−2.5 microns.

The blanket cylinder may have a diameter from about 40 mm to about 600 mm. While the diameter may vary widely, the variations in diameter or the out of round run out must be limited to +/−12.5 microns. This is necessary to ensure that the proper nip is achieved with the blanket cylinder and the pressure roller and that good image transfer from the image cylinder to the blanket cylinder and from the blanket cylinder to the substrate is accomplished.

Desirably the outside of the blanket cylinder sleeve has a Shore A hardness of about 65+/−5. The hardness is readily varied by changing the formulation of the polymer, as well known to those skilled in the art. The thickness of the sleeve wall may be from about 1 to about 20 mm. The sleeve wall is polymer and is rigid enough to handle. Further the polymer desirably has a conductivity of at least $10^8$ to $10^{14}$ ohms·cm. Generally the conductivity of the blanket cylinder sleeve is less than for the image cylinder sleeve, although the charge on the blanket cylinder is typically higher than that on the image cylinder. To produce an acceptable exterior surface on blanket cylinder 14, it is necessary that the wall thickness of the sleeve be held to a wall thickness variation of +/−2.5 microns. Generally the blanket cylinder sleeve exterior is more compliant than the exterior of the image cylinder sleeve.

Sleeves have been formed in the past by positioning the sleeves on a seamless metal core typically formed by plating. The metal core provided support for the positioning of the polymer around the metal core and then the polymer was machined to the required size. Both the requirement for the metal core and the requirement for machining represent expensive and time consuming operations that have been required to achieve the precision necessary to produce the sleeves for the blanket cylinder. Recently methods for producing such sleeves without a metal core have been proposed.

As well known to those skilled in the art, an image-accepting layer is required on the outside of the image cylinder. This layer has been applied by processes, such as ring coating, dipping and the like. It is also known that inorganic or organic layers may be applied over the image-accepting layer to modify surface properties such as surface energy. The use and application of outer layers is not considered to constitute part of the present invention, which is directed to the production of a sleeve for an image cylinder meeting the exacting requirements for such a sleeve.

Typically the wall of the sleeve is at least partially thermoplastic, thermoset and elastomeric polymers or combinations thereof and particularly polyurethanes are preferred. Polysiloxanes and fluorocarbon polymers and copolymers may also be used. The properties of the polymer may be varied as known to those skilled in the art to produce the desired properties in the sleeve. The polymer may contain additives, fillers and the like as known to the art and may be used a blends of a plurality of polymers.

As well known to those skilled in the art, a thin hard release layer such as a sol-gel, a ceramer or a fluoropolymer may be placed on the outside of the sleeve for the blanket cylinder. This layer has been applied by processes such as ring coating, dipping and the like. It is also known that inorganic or organic layers may be applied over the outside of the sleeve to modify surface properties such as surface energy. The use and application of such outer layers is not considered to constitute part of the present invention, which is directed to the production of a sleeve for a blanket cylinder meeting the exacting requirements for such a sleeve.

Figure 4:
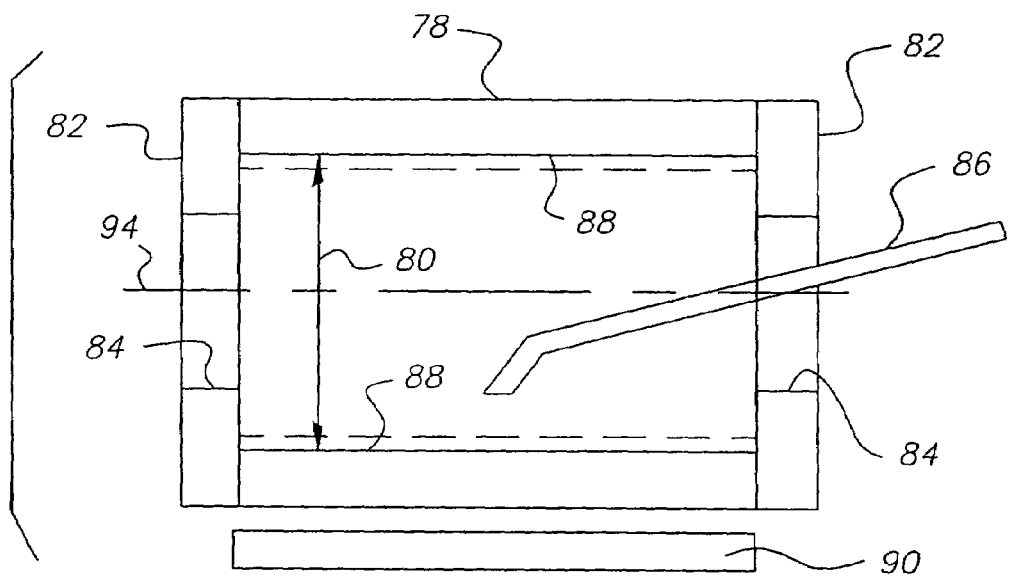
FIG. 4 is a schematic diagram of a mold positioned for rotation and injection of polymer material to form a polymer sleeve according to the present invention.
Figure 5:
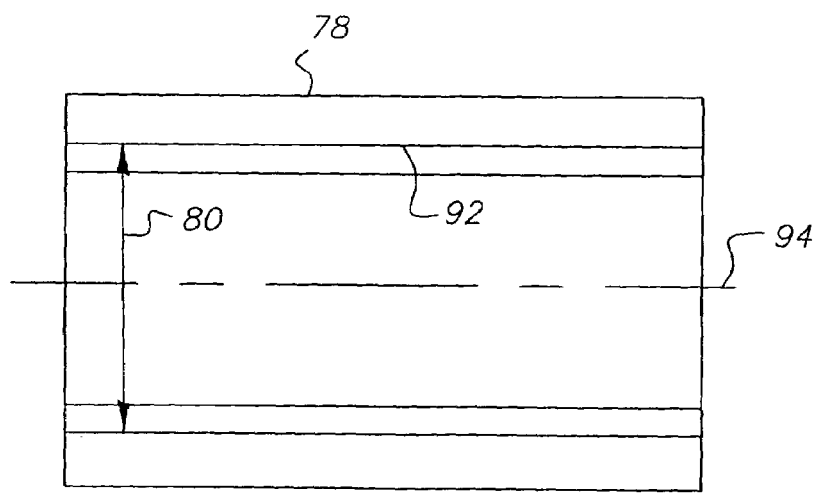
FIG. 5 shows a mold body that has been coated by a ring coating process.
Figure 6:
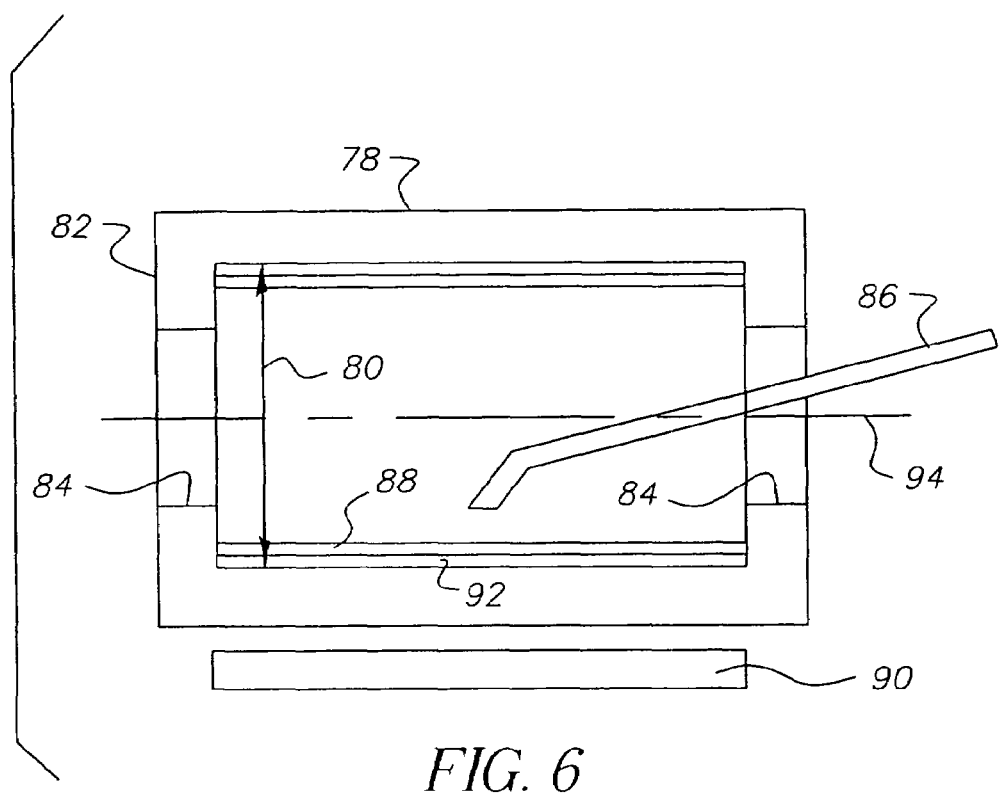
FIG. 6 shows an apparatus for producing a polymer sleeve having an exterior coating and a polymer layer positioned in a mold.

According to the present invention, such sleeves are readily produced by a method wherein a quantity of polymer precursors, a suitable liquid polymer, or a liquefiable polymer are positioned in a mold with the mold then being heated by a heater 90 to a suitable temperature to result in the presence of the polymer in the mold in a liquid form. A suitable mold is shown schematically in FIG. 4. The mold has a wall 78 and ends 82. Openings 84 are generally left in the ends.

While the polymer could be introduced in a number of ways, it is shown as being introduced through a tube 86 that supplies a quantity of polymer suitable to form a sleeve of the desired thickness and of uniform thickness in the mold. The uniformity is achieved by spinning the mold while the polymer is heated and as the polymer moves through a molten phase. The molding may be done with a thermoplastic material, which after liquefying is allowed to cool back into a hardened phase. In any event, the formation of the solid sleeve is accomplished with rotation of the mold at a rate sufficient to produce a centrifugal force equal to at least five and preferably at least about 10 and desirably from about 5 to about 100 times the force of gravity at the inside of the mold until the polymer has solidified.

Suitable plastics includes thermoplastic, thermoset and elastomeric polymers and blends thereof and particularly polyurethanes are preferred. With polyurethanes, polymer precursors may be placed into the mold and allowed to polymerize, cross-link and otherwise react to form the desired plastics as the mold spins. In any event, it has been found that when the inside of the mold is formed to have a surface within the required variations for the outside of the sleeve, that the inside of the sleeve and the sleeve wall thickness can be produced to sufficiently close tolerances by this method to enable its positioning over a mandrel and use on the blanket cylinder.

The heating and cooling of the mold may be at rates deemed suitable for the particular polymer used and desirably the rotation of the mold is continued until the polymer has reached a temperature of about 100° C. and thereafter until the polymer is cooled to a temperature selected for convenience in handling and the like. After cooling, the sleeve typically releases from the inside of the mold by contraction of the polymer so that the sleeve is readily removed from the mold by simply removing one of ends 82 and removing the sleeve. The sleeve is then ready for use or for coating with additional materials that may be desired on its exterior. A heater 90 is shown but it will be understood that any suitable type of heater can be used.

While sleeves can be produced by the molding process described above, the sleeves can also be produced by use of a production mandrel with the sleeve being formed of a suitable polymer material positioned on the production mandrel with the production mandrel them being rotated to machine the polymer material to a desired configuration and thickness on the production mandrel. The sleeve is then removed from the production mandrel and can be used without a core. The polymer material can be placed on the production mandrel by any of a variety of known methods such as extrusion casting, injection casting, ribbon casting and the like, but in all instances the production mandrel must have an outer diameter smaller than the outer diameter of the mandrel. The sleeve has an inner diameter equal to the outer diameter of the production mandrel.

In either case, the use of the sleeve without the nickel core achieves certain advantages. Particularly, the nickel cores used in the sleeves for the blanket cylinder must be formed very precisely at a high cost. In addition, the handling of the nickel sleeve during the manufacturing process is high due to the intensive cleaning and priming steps required. Elimination of the use of a nickel core represents a substantial cost savings.

While the sleeves of the present invention may be formed by either process, they still require the positioning of an outer coating such as a ceramer, a sol-gel or a fluorocarbon polymer or copolymer or an image-accepting coating on the exterior of the sleeve. As indicated previously, such coatings can be applied readily by ring coating, dipping and the like. If the molding process is used, the exterior coating may be applied as a layer either inside the mold prior to positioning the polymer body of the sleeve or as one constituent of the mixture placed in the mold prior to rotation.

By the process of the present invention, sleeves can be produced much more economically and more efficiently than with previously used methods. The sleeves produced consist essentially of a polymer sleeve for use by positioning it over an outer diameter of a mandrel. The polymer sleeve has a wall thickness from about 0.1 to about 20 mm, an inner diameter smaller than the outer diameter of the mandrel, a Shore A hardness of about 65+/−5 for a blanket cylinder and about 90+/−10 for an image cylinder and a wall thickness variation of no more than about +/−2.5 mm from the average wall thickness. These sleeves are highly desirable as replacement sleeves around the outside of mandrels in image cylinders and blanket cylinders. These sleeves are also much more economically produced while providing sleeves of an equivalent or superior quality to those produced by prior art methods.

While the sleeves produced by the method described are beneficial because they are more economical and provide adequately controlled wall thicknesses and surface properties, they must be produced at a size somewhat less than the outer diameter of the mandrel upon which they are to be placed. The undersizing is greater than that typically used with sleeves that contain a nickel core. For instance, a sleeve including a nickel or other metal core may be about 100 microns smaller than the outer diameter of a mandrel upon which it is to be placed. It has been found with the sleeves containing no nickel or other metal core that typically the undersizing must be in the range from about 1 to about 20 and preferably from about 4 to about 12 percent of the outside diameter of the mandrel. This difference is primarily the result of the fact that the nickel or other metal core is relatively unexpandable whereas the polymer functions as a more elastomeric material. Since the polymer is more elastic, a greater expansion is necessary in order to obtain a desired friction between the inside of the sleeve and the outside of the mandrel. The amount of difference will depend upon a variety of factors such as the particular polymer used, the thickness of the sidewall of the sleeve and the like. These factors exert quantifiable effects upon the friction between the inside of the sleeve and the outside of the mandrel.

Another difference that is not immediately apparent based upon the use of the sleeves having a nickel core, is that when the polymer sleeve is positioned over the mandrel it is of necessity stretched to a considerable extent. As the sleeve is stretched, it tends to have a reduced length. This can result in a sleeve having a shorter length than the mandrel upon which it is positioned if the sleeve has originally been manufactured to the same length as the mandrel. While such a difference may be slight if discernible at all with respect to a sleeve containing a nickel core, it can be substantial with respect to a polymer sleeve, which is stretched to have a diameter from 1 to 20 percent greater than its unstretched inside diameter. This stretching results in a sleeve having a reduced length that is unacceptable for most applications.

Accordingly, it is necessary to determine the length of the sleeve in its stretched condition as the sleeve is being manufactured and in its unstretched condition and adjust the length of the sleeve to a length as manufactured which upon installation on a mandrel will have the same length as the mandrel. The desired pre-installation length is readily determined based upon the sleeve materials, degree of undersizing and the like.

These considerations are applicable to both image cylinder sleeves and blanket cylinder sleeves. As well known to those skilled in the art, image cylinder sleeves and blanket cylinder sleeves have different properties with respect to their hardness and with respect to the materials that are placed on their outer surface. The image cylinder sleeves include an image-accepting material on their outer surface so that an image can be placed on the image cylinder, coated with toner and thereafter transferred to the blanket cylinder. The blanket cylinder by contrast has a relatively wear-resistant, low-surface energy outer coating placed upon its exterior surface, such as a sol-gel, ceramer, fluorocarbon polymers or copolymers and the like. Sleeves for both these cylinders are subject to the requirement for providing a sleeve that has the desired length upon stretching.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for producing a polymer sleeve for mounting on a mandrel having an outer diameter and a length to produce a blanket cylinder or an image cylinder for use in an electrophotographic process, the method comprising the steps of:
   a. providing a rotatable mold having an inside diameter and a length, the inside diameter of the mold being equal to a desired outer diameter of the polymer sleeve;
   b. injecting at least one of a thermoplastic, a thermoset, an elastomeric and a polyurethane polymer and blends thereof into the rotatable mold in a quantity to produce the polymer sleeve having an inside and with a desired sidewall thickness upon heating and rotating the rotatable mold, the inside of the sleeve having a diameter from about 1 to about 20 percent less than the outer diameter of the mandrel; and
   c. adjusting the length of the rotatable mold to produce the polymer sleeve of a length, which upon positioning on the mandrel is equal to the length of the mandrel.

2. The method of claim 1 wherein the polymeric materials comprises a polyurethane.

3. The method of claim 1 wherein the polymer sleeve has a diameter from about 4 to about 12 percent less than the outer diameter of the mandrel.

4. The method of claim 1 wherein the sleeve has a sidewall having a thickness from about 0.1 to about 40 mm.

5. The method of claim 1 wherein the polymer sleeve is a blanket cylinder sleeve and an outer coating selected from a sol-gel, a ceramer and a fluorocarbon polymer or copolymer is positioned on the outside of the blanket cylinder sleeve.

6. The method of claim 1 wherein the polymer sleeve is an image cylinder sleeve and an outer coating comprising an image-accepting coating is positioned on the outside of the image cylinder sleeve.

* * * * *